US010013678B2

(12) United States Patent
Matsuyama et al.

(10) Patent No.: US 10,013,678 B2
(45) Date of Patent: Jul. 3, 2018

(54) BATTERY SECONDARY USE MANAGEMENT SYSTEM

(71) Applicant: NISSAN MOTOR CO., LTD., Yokohama-shi, Kanagawa (JP)

(72) Inventors: Chizuru Matsuyama, Kanagawa (JP); Norihiko Hirata, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 131 days.

(21) Appl. No.: 14/907,187

(22) PCT Filed: Jul. 14, 2014

(86) PCT No.: PCT/JP2014/068694
§ 371 (c)(1),
(2) Date: Jan. 22, 2016

(87) PCT Pub. No.: WO2015/012144
PCT Pub. Date: Jan. 29, 2015

(65) Prior Publication Data
US 2016/0162849 A1    Jun. 9, 2016

(30) Foreign Application Priority Data

Jul. 25, 2013 (JP) .................................. 2013-154388
Oct. 4, 2013 (JP) .................................. 2013-208882

(51) Int. Cl.
*H01M 10/42* (2006.01)
*G06Q 10/00* (2012.01)
(Continued)

(52) U.S. Cl.
CPC ............ *G06Q 10/20* (2013.01); *B60L 3/0046* (2013.01); *B60L 3/04* (2013.01); *B60L 3/12* (2013.01);
(Continued)

(58) Field of Classification Search
CPC . B60L 11/1822; B60L 11/1857; G06Q 10/20; H01M 2010/4271; Y02T 10/7005; Y02T 10/7072; Y02T 90/124
See application file for complete search history.

(56) References Cited

U.S. PATENT DOCUMENTS 8,855,954 B1 * 10/2014 Bickford .................. G07C 3/08
702/63
2007/0108946 A1    5/2007 Yamauchi et al.
(Continued)

FOREIGN PATENT DOCUMENTS

CN          102387936 A        3/2012
EP          2385349 A1  * 11/2011 ............. G01C 21/34
(Continued)

*Primary Examiner* — John Breene
*Assistant Examiner* — Yaritza H Perez Bermudez
(74) *Attorney, Agent, or Firm* — Young Basile Hanlon & MacFarlane, P.C.

(57) ABSTRACT

A battery secondary use management system for managing a secondary use destination of a battery in use by using information of the battery includes an expired use time prediction unit configured to obtain estimated degradation information of the battery in use and predict an expired use time of the battery in use on the basis of the estimated degradation information which is acquired, and a secondary use destination determining unit configured to determine in advance the secondary use destination of the battery in use before expiration of use on the basis of the expiration-of-use date which is predicted.

17 Claims, 9 Drawing Sheets

(51) Int. Cl.
*H01M 10/48* (2006.01)
*B60L 3/00* (2006.01)
*B60L 3/04* (2006.01)
*B60L 3/12* (2006.01)
*B60L 11/18* (2006.01)

(52) U.S. Cl.
CPC ....... *B60L 11/1822* (2013.01); *B60L 11/1857* (2013.01); *B60L 11/1861* (2013.01); *H01M 10/425* (2013.01); *H01M 10/4207* (2013.01); *H01M 10/4257* (2013.01); *H01M 10/48* (2013.01); *B60L 2240/545* (2013.01); *B60L 2240/547* (2013.01); *B60L 2240/549* (2013.01); *B60L 2240/80* (2013.01); *B60L 2250/10* (2013.01); *B60L 2250/16* (2013.01); *H01M 2010/4271* (2013.01); *H01M 2010/4278* (2013.01); *H01M 2220/20* (2013.01); *Y02T 10/7005* (2013.01); *Y02T 10/705* (2013.01); *Y02T 10/7044* (2013.01); *Y02T 10/7072* (2013.01); *Y02T 90/124* (2013.01); *Y02T 90/14* (2013.01)

(56) References Cited

U.S. PATENT DOCUMENTS

| | | | |
|---|---|---|---|
| 2012/0158229 A1* | 6/2012 | Schaefer | B60L 11/1842 701/22 |
| 2013/0030696 A1* | 1/2013 | Wu | B60L 1/003 701/431 |
| 2014/0320144 A1 | 10/2014 | Nakaya | |
| 2017/0062883 A1 | 3/2017 | Nakaya | |

FOREIGN PATENT DOCUMENTS

| | | |
|---|---|---|
| JP | 2005-302337 A | 10/2005 |
| JP | 2007141464 A | 6/2007 |
| JP | 2013120640 A | 6/2013 |
| JP | 5247874 B2 | 7/2013 |

* cited by examiner

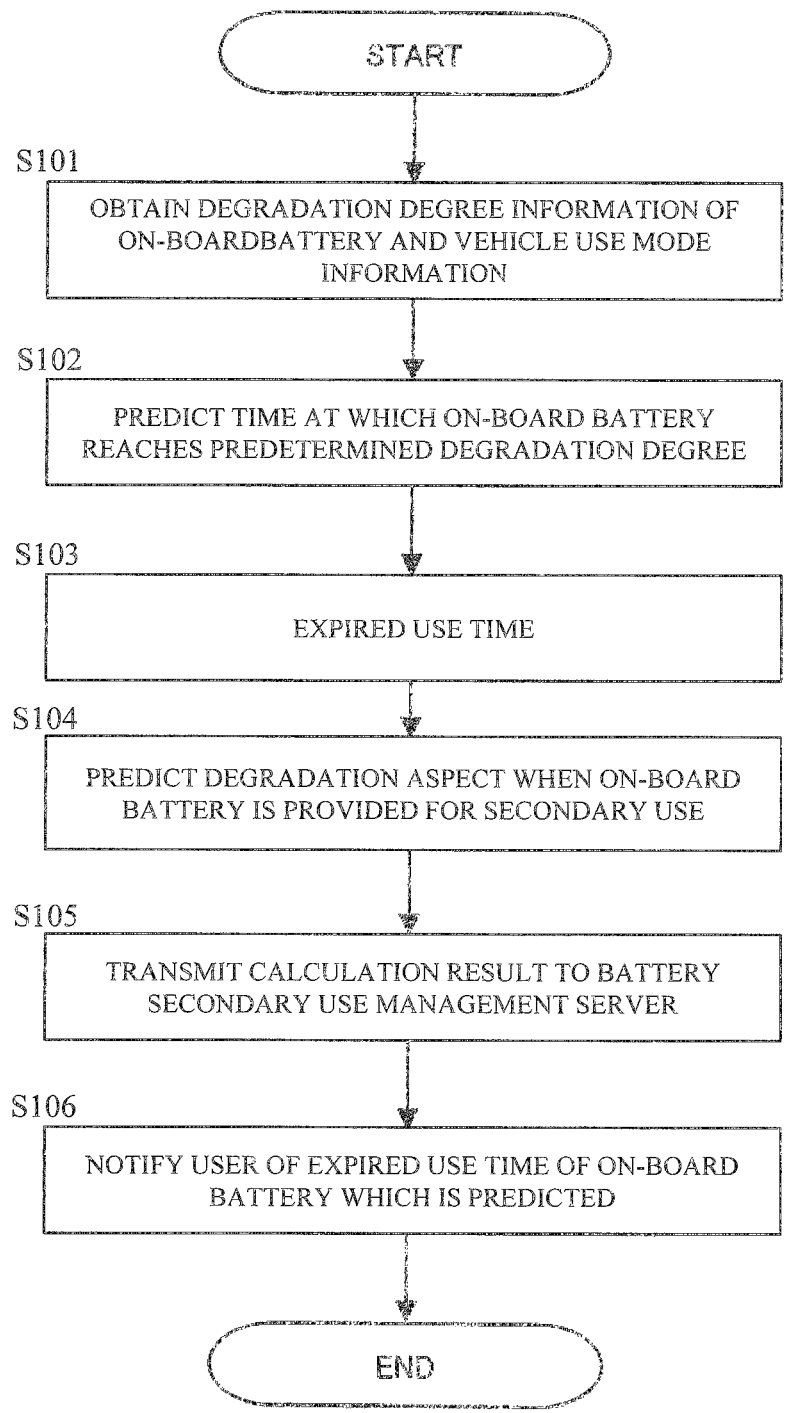

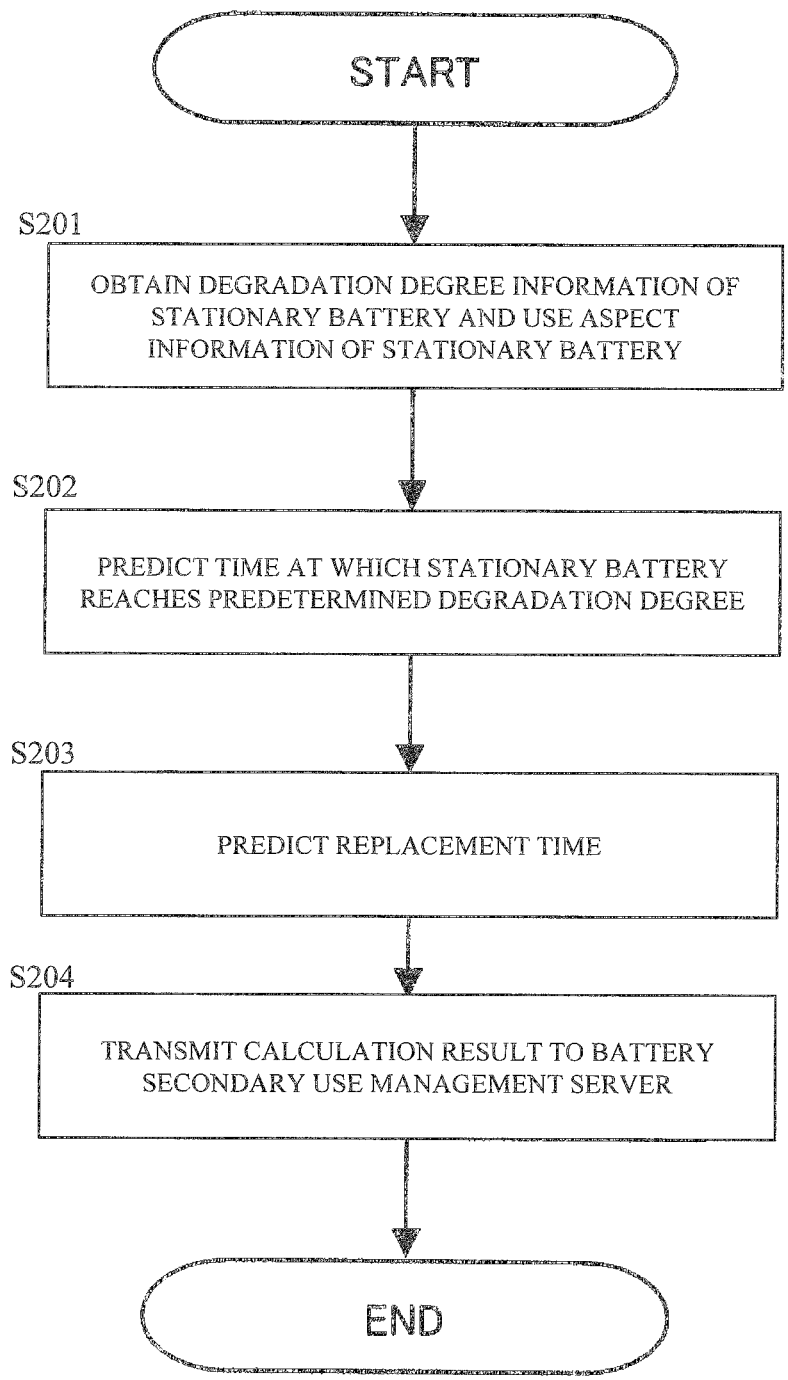

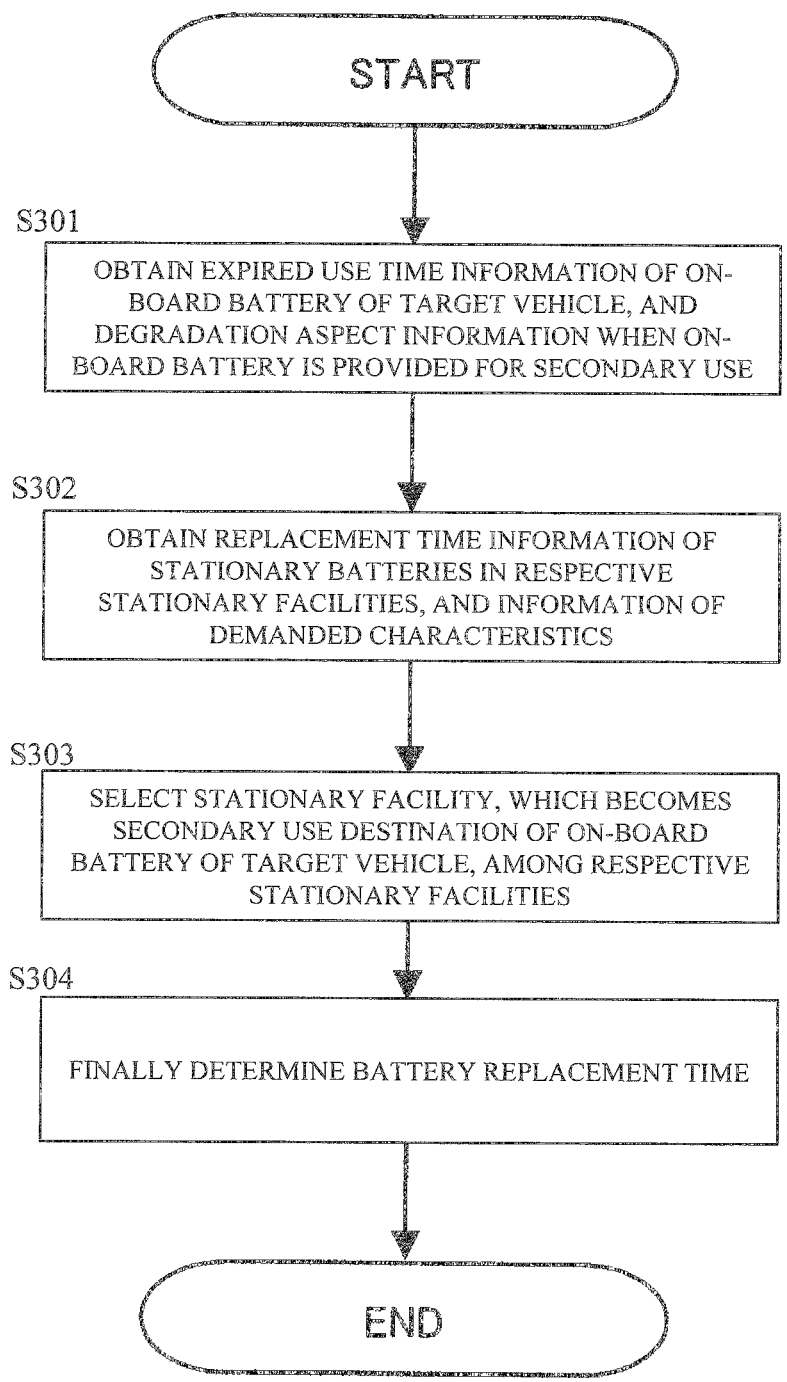

Fig.5

(A) STOCK QUANTITY WHEN BATTERY SECONDARY MANAGEMENT SERVER OF THIS EMBODIMENT IS USED

|  | FIRST YEAR | | | | SECOND YEAR | | | | THIRD YEAR | | | |
|---|---|---|---|---|---|---|---|---|---|---|---|---|
|  | APRIL TO JUNE | JULY TO SEPTEMBER | OCTOBER TO DECEMBER | JANUARY TO MARCH | APRIL TO JUNE | JULY TO SEPTEMBER | OCTOBER TO DECEMBER | JANUARY TO MARCH | APRIL TO JUNE | JULY TO SEPTEMBER | OCTOBER TO DECEMBER | JANUARY TO MARCH |
| BATTERY A | 100 | 50 | 50 | 100 | 125 | 100 | 150 | 100 | 100 | 75 | 75 | 50 |
| BATTERY B | 150 | 75 | 50 | 75 | 100 | 75 | 50 | 50 | 100 | 75 | 100 | 50 |
| BATTERY C | 50 | 75 | 75 | 75 | 75 | 100 | 75 | 75 | 75 | 75 | 50 | 50 |
| BATTERY D | 150 | 100 | 150 | 150 | 150 | 125 | 150 | 150 | 125 | 150 | 100 | 50 |

(B) STOCK QUANTITY IN RELATED ART IS USED

|  | FIRST YEAR | | | | SECOND YEAR | | | | THIRD YEAR | | | |
|---|---|---|---|---|---|---|---|---|---|---|---|---|
|  | APRIL TO JUNE | JULY TO SEPTEMBER | OCTOBER TO DECEMBER | JANUARY TO MARCH | APRIL TO JUNE | JULY TO SEPTEMBER | OCTOBER TO DECEMBER | JANUARY TO MARCH | APRIL TO JUNE | JULY TO SEPTEMBER | OCTOBER TO DECEMBER | JANUARY TO MARCH |
| BATTERY A | 250 | 150 | 200 | 250 | 300 | 400 | 350 | 400 | 400 | 400 | 400 | 350 |
| BATTERY B | 200 | 250 | 300 | 300 | 350 | 450 | 400 | 450 | 450 | 450 | 500 | 300 |
| BATTERY C | 300 | 250 | 375 | 350 | 400 | 500 | 480 | 500 | 500 | 500 | 450 | 450 |
| BATTERY D | 500 | 450 | 750 | 750 | 800 | 950 | 1000 | 1000 | 950 | 1000 | 850 | 800 |

Fig.6

(A) NUMBER OF BATTERIES WHICH ARE UNEXPECTEDLY NECESSARY IN CASE OF USING BATTERY SECONDARY USE MANAGEMENT SYSTEM OF THIS EMBODIMENT

|  | FIRST YEAR | | | | SECOND YEAR | | | | THIRD YEAR | | | |
|---|---|---|---|---|---|---|---|---|---|---|---|---|
|  | APRIL TO JUNE | JULY TO SEPTEMBER | OCTOBER TO DECEMBER | JANUARY TO MARCH | APRIL TO JUNE | JULY TO SEPTEMBER | OCTOBER TO DECEMBER | JANUARY TO MARCH | APRIL TO JUNE | JULY TO SEPTEMBER | OCTOBER TO DECEMBER | JANUARY TO MARCH |
| BATTERY A | 0 | 62.5 | 0 | 0 | 0 | 0 | 0 | 0 | 0 | 0 | 0 | 0 |
| BATTERY B | 0 | 0 | 0 | 0 | 0 | 0 | 0 | 0 | 0 | 0 | 0 | 0 |

(B) NUMBER OF BATTERIES WHICH ARE UNEXPECTEDLY NECESSARY IN RELATED ART

|  | FIRST YEAR | | | | SECOND YEAR | | | | THIRD YEAR | | | |
|---|---|---|---|---|---|---|---|---|---|---|---|---|
|  | APRIL TO JUNE | JULY TO SEPTEMBER | OCTOBER TO DECEMBER | JANUARY TO MARCH | APRIL TO JUNE | JULY TO SEPTEMBER | OCTOBER TO DECEMBER | JANUARY TO MARCH | APRIL TO JUNE | JULY TO SEPTEMBER | OCTOBER TO DECEMBER | JANUARY TO MARCH |
| BATTERY A | 100 | 62.5 | 0 | 75 | 187.5 | 0 | 37.5 | 0 | 0 | 75 | 37.5 | 125 |
| BATTERY B | 225 | 250 | 187.5 | 25 | 87.5 | 62.5 | 125 | 0 | 0 | 62.5 | 0 | 0 |

Fig.9

| CLASSIFICATION | USE AREA | TRAVEL DISTANCE | NECESSARY OUTPUT |
|---|---|---|---|
| 1 | HIGH-TEMPERATURE AREA | LONG | LARGE |
| 2 | HIGH-TEMPERATURE AREA | INTERMEDIATE | INTERMEDIATE |
| 3 | HIGH-TEMPERATURE AREA | SHORT | SMALL |
| 4 | INTERMEDIATE-TEMPERATURE AREA | LONG | LARGE |
| 5 | INTERMEDIATE-TEMPERATURE AREA | INTERMEDIATE | INTERMEDIATE |
| 6 | INTERMEDIATE-TEMPERATURE AREA | SHORT | SMALL |
| 7 | LOW-TEMPERATURE AREA | LONG | LARGE |
| 8 | LOW-TEMPERATURE AREA | INTERMEDIATE | INTERMEDIATE |
| 9 | LOW-TEMPERATURE AREA | SHORT | SMALL |
| 10 | OTHERS | | |

BATTERY SECONDARY USE MANAGEMENT SYSTEM

CROSS REFERENCE TO RELATED APPLICATIONS

The present application claims priority to Japanese Patent Application No. 2013-154388 (filed on Jul. 25, 2013) and Japanese Patent Application No. 2013-208882 (filed Oct. 4, 2013), each incorporated herein by reference in its entirety.

TECHNICAL FIELD

The present invention relates to a battery secondary use management system for managing a secondary use destination of a battery by using information of the battery in use.

BACKGROUND

In the related art, there is known a reuse system that collects a used battery and determines a secondary use destination on the basis of information of the used battery which is collected.

However, in the technology of the related art, the secondary use destination (or the reuse destination) of the battery is determined after collection of the used battery, and thus the battery is stored as a stock. Accordingly, there is a problem in that the management cost relating to the storage is high, or a problem in that battery degradation progresses due to lengthening of a storage period and thus battery performance decreases.

SUMMARY

An object of the present invention is to provide a battery secondary use management system capable of shortening a stock storage period when secondarily using the used battery.

The invention achieves the above objection by predicting expired use time of a battery in use on the basis of estimated degradation information of the battery in use and determining in advance a secondary use destination of the battery in use before expiration of use on the basis of the predicted expired use time which is predicted.

According to the invention, since the expired use time of the battery in use is predicted and the secondary use destination of the battery in use is determined in advance before expiration of use on the basis of the expired use time which is predicted, it is possible to determine the secondary use destination which is appropriate as a secondary use destination of a secondary battery in use before expiration of use. Therefore, it is possible to shorten a stock storage period when secondarily using the battery.

BRIEF DESCRIPTION OF THE DRAWINGS

FIG. 2 is a flowchart illustrating a process which is executed by an on-board battery management server 200;

FIG. 3 is a flowchart illustrating a process which is executed by a stationary battery management server 300;

FIG. 4 is a flowchart illustrating a process which is executed by a battery secondary use management server 100.

FIG. 5 is a view illustrating an effect of this embodiment;

FIG. 6 is a view illustrating an effect of this embodiment;

FIG. 9 is a table illustrating an example of user classification.

DETAILED DESCRIPTION OF THE EMBODIMENTS

Hereinafter, embodiments of the invention will be described with reference to the drawings.

Figure 1:
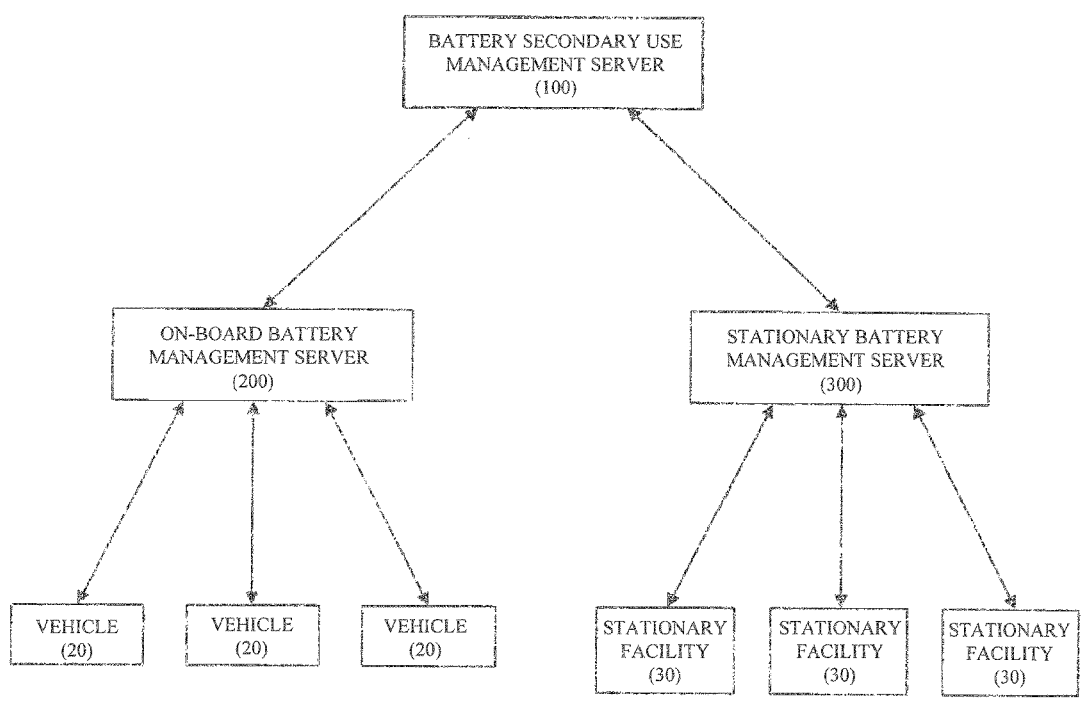
FIG. 1 is a block configuration diagram of a battery secondary use management system according to a first embodiment.

FIG. 1 is a block configuration diagram of a battery secondary use management system according to this embodiment. As illustrated in FIG. 1, the battery secondary use management system of this embodiment includes a battery secondary use management server 100, an on-board battery management server 200, and a stationary battery management server 300.

The on-board battery management server 200 is a server for managing an on-board battery mounted on a plurality of vehicles 20. The on-board battery management server 200 estimates degradation progress of the on-board battery which is mounted on each of the vehicles 20 through communication with the vehicle 20. The on-board battery management server 200 predicts expired use time of the on-board battery for each vehicle 20 on the basis of the degradation progress information which is estimated. In addition, the on-board battery management server 200 transmits the predicted expired use time information of the on-board battery of the vehicle 20, to the battery secondary use management server 100. Further, in FIG. 1, only three vehicles 20 are illustrated, the number of the vehicles 20 is not particularly limited. Alternatively, the vehicle 20 may be a vehicle on which the on-board battery is mounted, and examples of the vehicle 20 include an electric vehicle, a hybrid vehicle, and the like.

The stationary battery management server 300 is a server for managing a stationary battery which is provided to a plurality of stationary facilities 30. The stationary battery management server 300 calculates an amount of degradation of the stationary battery provided to each of the stationary facilities 30 through communication with the stationary facility 30. The stationary battery management server 300 predicts replacement time of the stationary battery for each of the stationary facilities 30 on the basis of degradation information indicating the calculated degradation. In addition, the stationary battery management server 300 transmits the predicted replacement time information of the stationary battery to the battery secondary use management server 100. Further, in FIG. 1, only three stationary facilities 30 are illustrated, but the number of the stationary facilities 30 is not particularly limited. In addition, the stationary battery provided to the stationary facilities 30 includes a peak-shift battery provided to various facilities, a peak-cut battery provided to various facilities, a household battery, and the like.

The battery secondary use management server 100 determines in advance a secondary use destination of the on-board battery which is currently mounted on the vehicle 20 before expiration of use on the basis of various kinds of information including expired use time information of the on-board battery of the vehicle 20 and replacement time information of the stationary battery for each of the stationary facilities 30. The expired use time information is received from the on-board battery management server 200. The replacement time information is received from the stationary battery management server 300. Specifically, the battery secondary use management server 100 selects a secondary use destination of the on-board battery which is currently mounted on the vehicle 20 among the plurality of stationary facilities 30. The battery secondary use management server 100 determines the selected stationary facility 30 as the secondary use destination of the on-board battery.

First, description will be given to a specific operation executed by the on-board battery management server 200 with reference to the flowchart illustrated in FIG. 2. Further, the following process is executed by the on-board battery management server 200 communicating with the vehicle 20. In the following description, description will be given to a case in which specific one of the plurality of vehicles 20 is set as a target, but the following processes are executed for all of the vehicles 20 which constitute the battery secondary use management system according to this embodiment.

First, in step S101, the on-board battery management server 200 communicates with the vehicle 20 (hereinafter, referred to as a target vehicle 20) which becomes a target, and obtains degradation degree information of the on-board battery and vehicle use mode information from the target vehicle 20. Examples of the degradation degree information of the on-board battery include information about a current battery capacity (fully charged capacity) with respect to an initial battery capacity (fully charged capacity) (for example, information of a rate of the current battery capacity when the initial battery capacity is set to 100%), and the like. The information is managed by a controller such as a battery controller provided to the target vehicle 20. Examples of the vehicle use mode information include use frequency of the vehicle, information of a travel distance in a predetermined period (for example, one week or one month), information of a travel distance for each travel, and the like. In addition, although not particularly limited, examples of a method of obtaining the degradation degree information of the on-board battery and the vehicle use mode information from target vehicle 20 include a method of using various communication technologies such as telemarketing communication, and the like. Instead of the method using the communication technology, it is possible to employ an aspect of obtaining the information through an electronic system diagnosis tester such as consulting, and the like.

In step S102, the on-board battery management server 200 predicts degradation progress of the on-board battery on the basis of the degradation degree information of the on-board battery of the target vehicle 20 and the vehicle use mode information which are obtained in step S101. Specifically, the on-board battery management server 200 predicts time at which the on-board battery reaches a degradation degree predetermined in advance on the basis of the vehicle use mode information, that is, use frequency of the vehicle, or a travel distance in a predetermined period (for example, one week or one month). That is, for example, the on-board battery management server 200 stores in advance a degree of degradation progress (a capacity decrease rate) of the on-board battery per the unit number of days for each use frequency of the vehicle or each travel distance in a predetermined period through an experiment and the like. The on-board battery management server 200 reads out the degree of degradation progress on the basis of the information obtained in step S101. The on-board battery management server 200 predicts time at which an on-board device reaches a predetermined degradation degree set in advance on the basis of the degree of degradation progress which is read out and the current degradation degree. Further, in this embodiment, it is preferable that a plurality of kinds of time, at which the predetermined degradation is reached, are set. For example, two kinds of time is preferably set. The two kinds of time are time at which a capacity reaches 85% of the initial and time at which the capacity reaches 80% of the initial capacity. The on-board battery management server 200 predicts each time at which the capacity reaches to each of the two kinds of time.

In step S103, the on-board battery management server 200 predicts the expired use time of the on-board battery of the target vehicle 20 on the basis of the time at which degradation degree of the on-board battery reaches the predetermined degradation degree predicted in step S102. In this embodiment, the expired use time of the on-board battery is set to the time at which a capacity reaches 80% of the initial capacity. Alternatively, in this embodiment, information of a travel distance for each travel may be searched from the vehicle use mode information obtained in step S101, and the expired use time may be predicted on the basis of the searched information. Specifically, the on-board battery management server 200 determines whether the target vehicle 20 is mainly used for long-distance transportation or is mainly used for short-distance transportation on the basis of the travel distance information for each travel. In addition, when the target vehicle 20 is mainly used for long-distance transportation, for example, the expired use time of the on-board battery is set to time at which a capacity reaches 85% of the initial capacity (time at which the degradation degree is relatively low). On the other hand, when the target vehicle 20 is mainly used for short-distance transportation, for example, expired use time of the on-board battery is set to time at which a capacity reaches 80% of the initial capacity (time at which the degradation degree is relative high). In addition, when expired use time of the on-board battery is determined in advance for a lease contract of the on-board battery, car sharing, and the like, the expired use time is set to expired use time which is determined in advance.

In step S104, when the on-board battery mounted on the target vehicle 20 is used for secondary use, the on-board battery management server 200 predicts a degradation aspect in a secondary use destination. Further, for example, the degradation aspect in the secondary use destination is predicted on the basis of the battery capacity of the on-board battery, the degradation degree at time (expired use time) when use as the on-board battery is terminated, and the like. For example, the degradation aspect in the secondary use destination represents a degradation degree predicted from a degradation rate (a capacity decrease rate) of the on-board battery in the secondary use destination determined in advance and a current degradation degree. The degradation aspect corresponds to the number of years elapsed from initiation of the secondary use.

Then, in step S105, the on-board battery management server 200 transmits the expired use time information of the on-board battery predicted in step S103 and the degradation aspect information in the secondary use destination predicted in step S104 to the battery secondary use management server 100. In addition, as described later, the information can be used for a process of determining in advance the secondary use destination of the on-board battery which is currently mounted on the target vehicle 20.

Then, in step S106, the on-board battery management server 200 notifies a user of the target vehicle 20 of the expired use time information of the target vehicle 20 predicted through the above-described process. Examples of a method of notifying the user of the expired use time information include a method of displaying the expired use time of the on-board battery on a display of a navigation apparatus provided to the target vehicle 20. Particularly, when the user is notified of the expired use time information, the user can appropriately grasp the replacement time of the on-board battery and thus it is possible to allow the user to appropriately prepare for replacement. In addition, when expired use time of the on-board battery is approaching or the expired use time of the on-board battery is already reached, the on-board battery management server 200 gives the user a warming indicating that replacement of the on-board battery is necessary. According to this, it is possible to encourage the user to collect the on-board battery, and thus it is possible to improve accuracy of collecting the on-board battery.

As described above, the on-board battery management server 200 executes the process of predicting the expired use time of the on-board battery mounted on the target vehicle 20. Further, in this embodiment, the above-described processes are repetitively executed at a predetermined interval. Particularly, according to this embodiment, when repetitively executing the processes in steps S101 to S103, it is possible to raise prediction accuracy of time at which the on-board battery reaches a degradation predetermined in advance and prediction accuracy of the expired use time of the on-board battery. Specifically, the on-board battery management server 200 stores prediction results of the time at which the on-board battery reaches a predetermined degradation degree and the replacement time of the on-board battery every time that the above-described processes are executed. The on-board battery management server 200 predicts the time at which the on-board battery reaches the predetermined degradation degree and the replacement time of the on-board battery by using the stored data. According to this, it is possible to appropriately raise prediction accuracy of the time at which the on-board battery reaches the predetermined degradation degree and the replacement time of the on-board battery.

Then, description will be given to a specific operation which is executed by the stationary battery management server 300 illustrated in FIG. 1 with reference to a flowchart illustrated in FIG. 3. Further, the following processes are executed by the stationary battery management server 300 which communicates with the respective stationary facilities 30. In the following description, description will be given to a case in which specific one of the plurality of stationary facilities 30 is set as a target for example, but the following processes are executed for all of the stationary facilities 30 which constitute the battery secondary use management system according to this embodiment.

First, in step S201, the stationary battery management server 300 obtains degradation degree information of the stationary battery provided to the stationary facility 30 (hereinafter, referred to as a target stationary facility 30) which becomes a target, and use mode information of the stationary battery from the target stationary facility 30. Examples of the degradation degree information include information about a current battery capacity (fully charged capacity) with respect to an initial battery capacity (fully charged capacity) (for example, information of a rate of the current battery capacity when the initial battery capacity is set to 100%), and the like. The information is managed by a management device of a power source system provided to the target stationary facility 30. Examples of the use mode information of the stationary battery include information of an actual load amount (for example, a load amount that is obtained from a temperature profile, a power profile, and the like) of the stationary battery, and the like. In addition, a method of obtaining the degradation degree information of the stationary battery and the use mode information of the stationary battery from the target stationary facility 30 is not particularly limited, and examples of the method include a method of obtaining the degradation degree information and the use mode information through an internet line, a telephone line, and the like.

In step S202, the stationary battery management server 300 predicts degradation progress of the stationary battery on the basis of the degradation degree information of the stationary battery in the target stationary facility and the use mode information of the stationary battery. The degradation degree information and the use mode information are obtained in step S201. Specifically, time at which the stationary battery reaches a degradation degree (degradation degree at replacement time) which is predetermined in advance, is predicted from the use mode information of the stationary battery, that is, an actual load amount of the stationary battery. The stationary battery management server 300 can predict the time at which the stationary battery reaches the degradation degree (degradation degree at replacement time) predetermined in advance as follows. For example, a degradation rate is predicted from the actual load amount of the stationary battery, and then the time at which the stationary battery reaches the predetermined degradation degree (degradation degree at replacement time) is predicted from the predicted degradation rate and a current degradation degree of the stationary battery. Further, the predetermined degradation degree can be determined, for example, in accordance with the amount of power required for the target stationary facility 30.

In step S203, the stationary battery management server 300 predicts replacement time of the stationary battery of the target stationary facility 30 on the basis of the time at which the stationary battery reaches the predetermined degradation degree predicted in step S202. In this embodiment, replacement time of the stationary battery is set to the time at which the stationary battery reaches the predetermined degradation degree predicted in step S202

Then, in step S204, the stationary battery management server 300 transmits the replacement time information of the stationary predicted in step S203 to the battery secondary use management server 100. In addition, at this time, the stationary battery management server 300 transmits characteristics information in addition to the replacement time information of the stationary battery to the battery secondary use management server 100. The characteristics information indicates characteristics demanded for the stationary battery so as to use the stationary battery in the target stationary facility 30 after replacement. Further, the demanded characteristic information includes information of a required battery capacity, information of usable years, and the like. In addition, as described later, in the target stationary facility 30, when exchanging the currently used stationary battery with a new battery, the stationary battery management server 300 uses these kinds of information for a process of determining which vehicle supplies an on-board battery in use among the plurality of vehicles 20.

As described above, the stationary battery management server 300 executes the process of predicting the replacement time of the stationary battery provided in the target stationary facility 30. Further, in this embodiment, the above-described processes are repetitively executed at a predetermined interval. Particularly, according to this embodiment, when repetitively executing the processes in steps S201 to S203, it is possible to raise reduction accuracy of time at which the stationary battery reaches a degradation degree predetermined in advance and reduction accuracy of the replacement time of the stationary battery. Specifically, the stationary battery management server 300 stores prediction results of the time at which the stationary battery reaches the predetermined degradation degree, and the replacement time of the stationary battery every time that the above-described processes are executed. The stationary battery management server 300 predicts the time at which the stationary battery reaches the predetermined degradation degree and the replacement time of the stationary battery by using the stored data. According to this, it is possible to appropriately raise prediction accuracy of the time at which the on-board battery reaches the predetermined degradation degree and the replacement time of the on-board battery.

Then, description will be given to a specific operation which is executed by the battery secondary use management server 100 illustrated in FIG. 1 with reference to a flowchart illustrated in FIG. 4. Further, the following processes are executed by the battery secondary use management server 100 which communicates with the on-board battery management server 200 and the stationary battery management server 300. In the following description, description will be given to a case in which specific one of the plurality of vehicles 20 is set as a target for example, but the following processes are executed for all of the vehicles 20 which constitute the battery secondary use management system according to this embodiment.

First, in step S301, the battery secondary use management server 100 obtains expired use time information of the on-board battery mounted on the target vehicle 20 and degradation aspect information in a secondary use destination transmitted from the on-board battery management server 200.

Then, in step S302, the battery secondary use management server 100 obtains replacement time information of the stationary battery provided to each of the stationary facilities 30 and information of characteristics demanded for the stationary battery after replacement transmitted from the stationary battery management server 300.

In addition, the process proceeds to step S303, and in step S303, the battery secondary use management server 100 selects the stationary facility 30 which becomes a secondary use destination of the on-board battery mounted on the target vehicle 20 among the respective stationary facilities 30 on the basis of the respective pieces of information obtained in step S301 and step S302. The battery secondary use management server 100 sets the selected stationary facility 30 to the secondary use destination (hereinafter, the stationary facility set as the secondary use destination is referred to as "secondary use destination stationary facility 30"). Specifically, the battery secondary use management server 100 compares the expired use time of the on-board battery mounted on the target vehicle 20 with the replacement time of the stationary battery provided to each of the stationary facilities 30, and the battery secondary use management server 100 compares a degradation aspect in the secondary use destination of the on-board battery mounted on the target vehicle 20 with characteristics demanded for the stationary battery after replacement in the stationary facility 30. The battery secondary use management server 100 selects the stationary facility 30 in which the expired use time of the on-board battery and the replacement time of the stationary battery approximate to each other, and a condition of the degradation aspect in the secondary use destination of the on-board battery and a condition of characteristics demanded for the stationary battery after replacement approximate to each other. The battery secondary use management server 100 sets the selected stationary facility 30 to the secondary use destination stationary facility 30. That is, the battery secondary use management server 100 specifies the stationary facility 30 in which the replacement time of the stationary battery is the most approximate to the expired use time of a specific on-board battery, as the stationary facility 30 which is a candidate for the secondary use destination of the specific on-board battery. In addition, the battery secondary use management server 100 compares a degradation degree (battery capacity) during initiation of the secondary use of the specific on-board battery with a battery capacity as characteristics demanded in the stationary facility 30 which is the candidate for the secondary use destination, and the battery secondary use management server 100 compares the number of years (usable years) of the secondary use of the specific on-board battery with usable years as characteristics demanded in the stationary facility 30. The number of years (usable years) of the secondary use of the specific on-board battery is the number of years until a degradation degree corresponding to the number of years elapsed from the initiation of the secondary use reaches the degradation degree at replacement time. And then, the battery secondary use management server 100 determines the most approximate stationary facility 30 as the secondary use destination stationary facility 30 on the basis of the comparison result. Further, as described above, the process of determining the secondary use destination of the on-board battery mounted on the target vehicle 20 is executed with respect to an on-board battery in use which is currently mounted on the target vehicle 20.

Then, the process proceeds to step S304. The battery secondary use management server 100 collects the battery mounted on the target vehicle 20 and finally determines time of replacing the stationary battery provided to the secondary use destination stationary facility 30 which is set in step S303 with the collected battery.

As described above, according to this embodiment, the process of determining in advance the secondary use destination of the on-board battery which is currently mounted on the target vehicle 20 is executed.

Further, the description has been given to a case in which the secondary use destination stationary facility 30 is determined in advance with respect to the single target vehicle 20 as an example, but the process of determining the secondary use destination stationary facility 30 is executed with respect to all of the vehicles 20 which constitute the battery secondary use management system according to this embodiment as described above. In addition, in this case, it is possible to employ an aspect in which the expired use time information of the plurality of vehicles 20 and the degradation aspect information in the secondary use destination are obtained, the expired use time information and the degradation aspect information are compared with each other, and the stationary facility 30 which becomes the secondary use destination is determined. Particularly, in this aspect, it is possible to more appropriately determine the secondary use destination with respect to the plurality of vehicles 20.

In addition, a plurality of the on-board batteries mounted on the respective vehicles 20 may be required in accordance with the scale of the power source system provided to the stationary facility 30. In this case, a plurality of the vehicles 20 in which the expired use time and the degradation aspect in the secondary use destination are approximate may be selected among the respective vehicles 20 The selected secondary use destinations of the respective vehicles 20 may be set as the same stationary facility 30. Alternatively, in a case that a capacity is excessively high in the on-board battery mounted on each of the vehicles 20 in accordance with the scale of the power source system provided to the stationary facility 30, the secondary use destination may be set for each module so that an appropriate capacity is set to the stationary facility 30 which becomes the secondary use destination when the on-board battery is a battery pack that is constituted by a plurality of modules. That is, in this case, a plurality of the stationary facilities 30 may be set as the secondary use destination of the on-board battery mounted on the vehicle 20. In addition, when the number of the simultaneously exchanged battery stationary battery is different in each other's the plurality of stationary facilities 30, the stationary facility 30 in which the larger numbers of the stationary batteries are replaced, may be preferentially specified as the secondary use destination of the on-board battery.

According to this embodiment, it is possible to predetermine the secondary use destination of the on-board battery which is mounted on the vehicle 20 and is currently in use, and thus it is possible to make a plan for secondary use of the battery with relatively high accuracy. According to this embodiment, it is possible to shorten a lead time from collection of the battery to supplement of the battery for the secondary use, and thus it is possible to reduce necessity for storage of the battery as a stock. As a result, it is possible to appropriately prevent a problem in that the management cost relating to the storage is high, a problem in that battery degradation progresses due to lengthening of a storage period and a problem in that battery performance decreases.

In addition, for example, in a method including the step of collecting used on-board batteries and the step of secondarily using a usable on-board battery among the used on-board batteries which are collected, since characteristics demanded by the stationary facility 30 may not be satisfied in many cases, and thus it is necessary to prepare a plurality of new batteries which satisfy the demanded characteristics. On the other hand, according to this embodiment, it is possible to determine in advance the secondary use destination of the on-board battery which is mounted on the vehicle 20 and is currently in use, and thus it is not necessary to prepare a plurality of new batteries. According to this, it is also possible to reduce the management cost relating to storage of the new batteries.

In addition, when the on-board battery mounted on the vehicle 20 is secondarily used in the stationary facility 30, it may be necessary to use a plurality of the on-board batteries mounted on a plurality of the vehicles 20 in combination, or it is necessary to provide the on-board battery as a battery pack constituted by a plurality of modules for the secondary use for each of the modules. In these cases, peripheral members such as a case and a connection member are necessary. According to this embodiment, the secondary use destination of the on-board battery is determined in advance, and thus it is not necessary to store the peripheral members, and it is possible to appropriately reduce the management cost relating to storage of the peripheral members. In addition, it is possible to determine whether the on-board battery as the battery pack constituted by the plurality of modules is provided in advance for the secondary use for each of the modules, or the on-board battery is provided for the secondary use as the battery pack. Accordingly, when the on-board battery is provided for the secondary use for each of the modules, it is possible to discard an unnecessary part by quickly performing disassembling into modules after collection of the on-board battery, and thus it is not necessary to store the unnecessary part as a stock. Accordingly, it is also possible to appropriately reduce the management cost relating to the storage of the unnecessary part.

In addition, according to this embodiment, when determining in advance the secondary use destination of the on-board battery which is mounted on the vehicle 20 and is currently in use, the degradation aspect in the secondary use destination of the on-board battery provided to the vehicle 20 and characteristics demanded by the stationary facility 30 are compared with each other to determine the secondary use destination. Accordingly, in this embodiment, it is possible to increase the number of populations of the vehicles 20 on a battery providing side and the stationary facilities 30 on a battery receiving side in comparison to a method of determining the secondary use destination of the battery after collecting or the used battery, and thus it is possible to appropriately select the on-board battery which satisfies the characteristics demanded by the stationary facility 30. According to this, it is possible to effectively prevent occurrence of a problem in that a battery not sufficiently satisfying the characteristics demanded by the stationary facility 30 is provided. As a result the number of times of battery replacement in the stationary facility 30 increases. In addition, it is also possible to prevent a problem in that a battery having battery performance higher than characteristics demanded by the stationary facility 30 is provided, and thus the battery performance becomes wasteful. Particularly, according to this embodiment, the degradation aspect in the secondary use destination of the on-board battery provided to the vehicle 20 and characteristics demanded by the stationary facility 30 are compared with each other to determine the secondary use destination, and thus it is possible to perform battery replacement in an aspect in which the number of times of battery replacement is the smallest in the guarantee period of the stationary facility 30.

FIG. 5 is a view illustrating an effect of this embodiment. FIG. 5 (A) is a table illustrating a variation in a stock quantity of the battery when the battery secondary use management system of this embodiment is used. FIG. 5 (B) is a table illustrating a variation in a stock quantity in an example of the related art (specifically, after collection of a used battery, the secondary use destination of the battery is determined). Further, in FIG. 5, a stock quantity is illustrated for each kind of batteries (that is, a battery A, a battery B, a battery C, and a battery D) by an index. The index in a stock quantity of the battery A from April to June of a first year in FIG. 5 (A) is deemed to be 100. As illustrated in FIG. 5, according to the battery secondary use management system of this embodiment, it is possible to further reduce the stock quantity in comparison to the example of the related art.

In addition, FIG. 6 is a view illustrating an effect of this embodiment. FIG. 6 (A) is a table illustrating a variation in the number of batteries which are unexpectedly required when using the battery secondary use management system of this embodiment (that is, the number of batteries which are not coped with a stock). FIG. 6 (B) is a table illustrating a variation in the number of batteries which are unexpectedly required in the related art (specifically, in an aspect in which a secondary use destination of the battery is determined after collection of a used battery). Further, in FIG. 6, the number of batteries which are unexpectedly required is illustrated for each kind of batteries (that is, a battery A, a battery B, a battery C, and a battery D) by an index. The index in the number of batteries A which are unexpectedly necessary from April to June of a first year in FIG. 6 (B) is deemed to be 100. As illustrated in FIG. 6, according to the battery secondary use management system of this embodiment, it is also possible to further reduce the number of batteries which are not coped with a stock and are unexpectedly required in comparison to the related art.

Further, in the above-described embodiment, description has been given to an aspect in which the on-board battery management server 200 performs prediction of the expired use time of the on-board battery mounted on the vehicle 20, the on-board battery management server 200 performs prediction of the degradation aspect in the secondary use destination, and the stationary battery management server 300 performs prediction of the replacement time of the stationary battery provided to the stationary facility 30. However, it is also possible to employ an aspect in which the battery secondary use management server 100 performs the prediction of the expired use time of the on-board battery, the prediction of the degradation aspect in the secondary use destination, and the prediction of the replacement time of the stationary battery. Further, in this case, the on-board battery management server 200 operates as a data center which stores respective kinds of information obtained from the vehicle 20, and transmits the respective kinds of information to the battery secondary use management server 100. In addition, similarly, the stationary battery management server 300 operates as a data center which stores respective kinds of information obtained from the stationary facility 30, and transmits the respective kinds of information to the battery secondary use management server 100.

Next, description will be given to a second embodiment of the invention. The second embodiment has the same configuration as in the first embodiment except for the following description, and can obtain the same operation effect as in the first embodiment.

Figure 7:
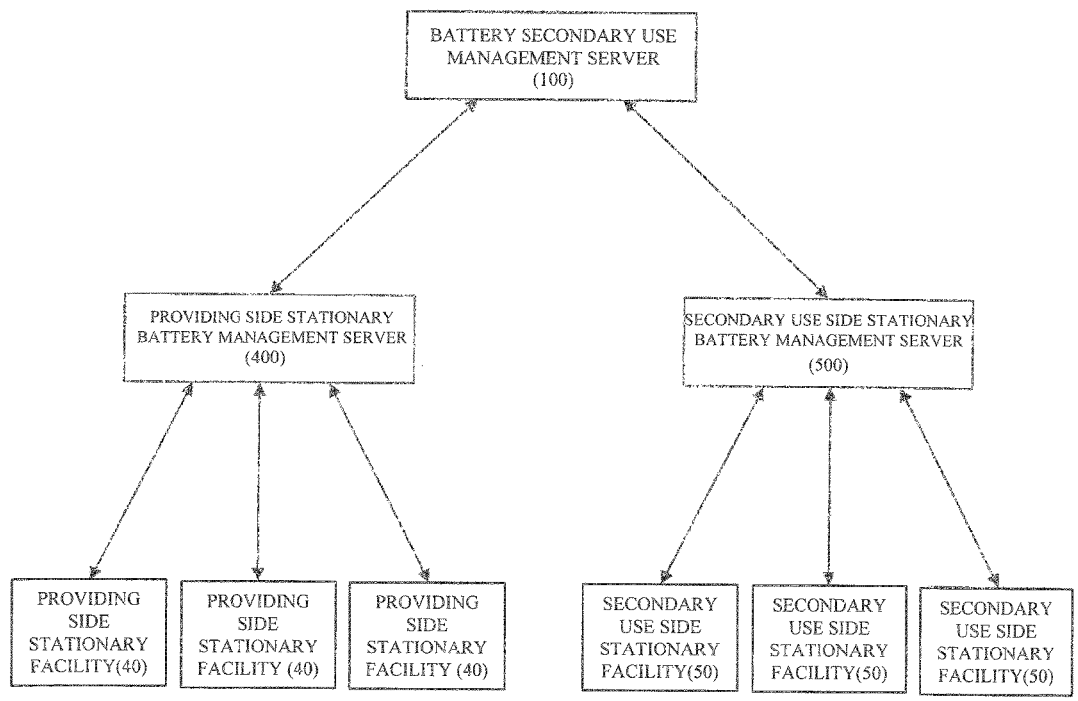
FIG. 7 is a block configuration diagram of a battery secondary use management system according to a second embodiment.

FIG. 7 is a block configuration diagram of a battery secondary use management system according to a second embodiment. As illustrated in FIG. 7, the battery secondary use management system of the second embodiment includes a battery secondary use management server 100, a providing side stationary battery management server 400, and a secondary use side stationary battery management server 500.

The battery secondary use management system according to the second embodiment is a system in which the stationary battery used in a providing side stationary facility 40 is secondarily used in a secondary use side stationary facility 50. In this point, the second embodiment is different from the first embodiment. Further, in the battery secondary use management system according to the second embodiment, a secondary use destination of the currently used stationary battery in the providing side stationary facility 40 is determined in advance during use of the stationary battery. In this point, the second embodiment is common to the first embodiment. Further, examples of the providing side stationary facility 40 include a facility in which a battery with relatively high performance is necessary, such as a facility provided with a household battery or a peak-shift battery provided to various facilities, and the like. In addition, examples of the secondary use side stationary facility 50 include a facility in which a battery with relatively low performance is also possible, such as a facility including a peak-cut battery provided to various facilities, and the like.

The providing side stationary battery management server 400 is a server for managing stationary battery provided to a plurality of the providing side stationary facilities 40. The providing side stationary battery management server 400 communicates with each of the respective providing side stationary facilities 40 so as to calculate the amount of the degradation of the stationary battery provided to the providing side stationary facility 40. The providing side stationary battery management server 400 performs prediction of the expired use time of the stationary battery on the basis of the calculated amount of the degradation included in the degradation information and use mode information of the stationary battery. Further, a method of calculating the amount of the degradation of the stationary battery is the same as in the first embodiment, and a method of predicting the expired use time of the stationary battery is the same as the method of predicting the replacement time of the stationary battery in the first embodiment. In addition, in the second embodiment, when predicting the expired use time of the stationary battery, time at which a capacity of the stationary battery reaches 40% of the initial capacity is set as the expired use time of the stationary battery. The stationary battery is less in demand for an instantaneous power output in comparison to the on-board battery. Thus, it is possible to employ a level as relatively low as 40% of the initial capacity for predicting the expired use time of the stationary battery.

In addition, the providing side stationary battery management server 400 transmits information indicating the predicted expired use time of the stationary battery of each of the providing side stationary facilities 40 to the battery secondary use management server 100 in combination with degradation aspect information in the secondary use destination. Further, the degradation aspect in the secondary use destination is predicted, for example, on the basis of the battery capacity of the stationary battery, a degradation degree in the expired use time, and the like. In addition, the providing side stationary battery management server 400 transmits the expired use time information which is predicted to a power source management system of the providing side stationary facility 40 so as to notify the power source management system of the expired use time information which is predicted.

In addition, the secondary use side stationary battery management server 500 is a server for managing the stationary battery provided to a plurality of the secondary use side stationary facilities 50. The secondary use side stationary battery management server 500 communicates with each of the secondary use side stationary facilities 50 so as to calculate degradation information of the stationary battery provided to the secondary use side stationary facility 50. The secondary use side stationary battery management server 500 predicts the replacement time of the stationary battery on the basis of the calculated degradation information and use mode information of the stationary battery. Further, a method of calculating the degradation information of the stationary battery and a method of obtaining the use mode information of the stationary battery are the same as in the first embodiment.

In addition, the secondary use side stationary battery management server 500 transmits information of the predicted replacement time of the stationary battery of the secondary use side stationary facility 50 to the battery secondary use management server 100 in combination with information of characteristics demanded for the stationary battery after replacement. Further, the information of the characteristics demanded for the stationary battery after replacement is obtained from the secondary use side stationary facility 50 as well as the first embodiment.

The battery secondary use management server 100 determines in advance the secondary use destination of the stationary battery which is currently used in the providing side stationary facility 40 among the respective secondary use side stationary facilities 50 before the expiration of use on the basis of the expired use time information of the stationary battery of the providing side stationary facility 40, the degradation aspect information in the secondary use destination, the replacement time information of the stationary battery of the secondary use side stationary facility 50, and the information of the characteristics demanded for the stationary battery after replacement. The expired use time information and the degradation aspect information are received from the providing side stationary battery management server 400. The replacement time information and the information of the characteristics are received from the secondary use side stationary battery management server 500. Further, a method of determining in advance the secondary use destination of the stationary battery which is currently used in the providing side stationary facility 40 is the same as in the first embodiment.

According to the second embodiment, when the stationary battery is secondarily used from the providing side stationary facility 40 which requires a battery with relatively high performance to the secondary use side stationary facility 50 in which a battery with relatively low performance is sufficient, it is also possible to obtain the same effect as in the first embodiment. The battery with relatively high performance is a household battery, a peak-shift battery provided to various facilities, or the like. The battery with relatively low performance is a peak-cut battery provided for various facilities or the like.

Further, in the above-described embodiment, description has been given to an aspect in which the providing side stationary battery management server 400 performs prediction of the expired use time of the stationary battery used in the providing side stationary facility 40, the providing side stationary battery management server 400 performs prediction of the degradation aspect in the secondary use destination, and the secondary use side stationary battery management server 500 performs prediction of the replacement time of the stationary battery provided to the secondary use side stationary facility 50. However, it is possible to employ an aspect in which the battery secondary use management server 100 performs the prediction of the expired use time of the stationary battery, the prediction of the degradation aspect in the secondary use destination, and the prediction of the replacement time of the stationary battery. Further, in this case, the providing side stationary battery management server 400 operates as a data center which stores respective kinds of information obtained from the providing side stationary facility 40, and transmits the respective pieces of information to the battery secondary use management server 100. Similarly, the secondary use side stationary battery management server 500 operates as a data center which stores the respective kinds of information obtained from the secondary use side stationary facility 50, and transmits the respective kinds of information to the battery secondary use management server 100.

Next, description will be given to a third embodiment of the invention. The third embodiment has the same configuration as in the first embodiment except for the following description, and can obtain the same operation effect as in the first embodiment.

That is, according to the first embodiment, in the battery secondary use management system illustrated in FIG. 1, the secondary use destination of the on-board battery which is currently mounted on the vehicle 20 is selected from the plurality of stationary facilities 30, and the selected stationary facility 30 is determined as the secondary use destination of the on-board battery. However, according to the third embodiment, in the battery secondary use management system illustrated in FIG. 1, when secondarily using the on-board battery which is currently mounted on the vehicle 20, it is determined whether or not the on-board battery can be used in another vehicle 20. When the on-board battery can be used in another vehicle 20, the on-board battery is secondarily used in another vehicle 20. In this point, the third embodiment is different from the first embodiment.

Figure 8:
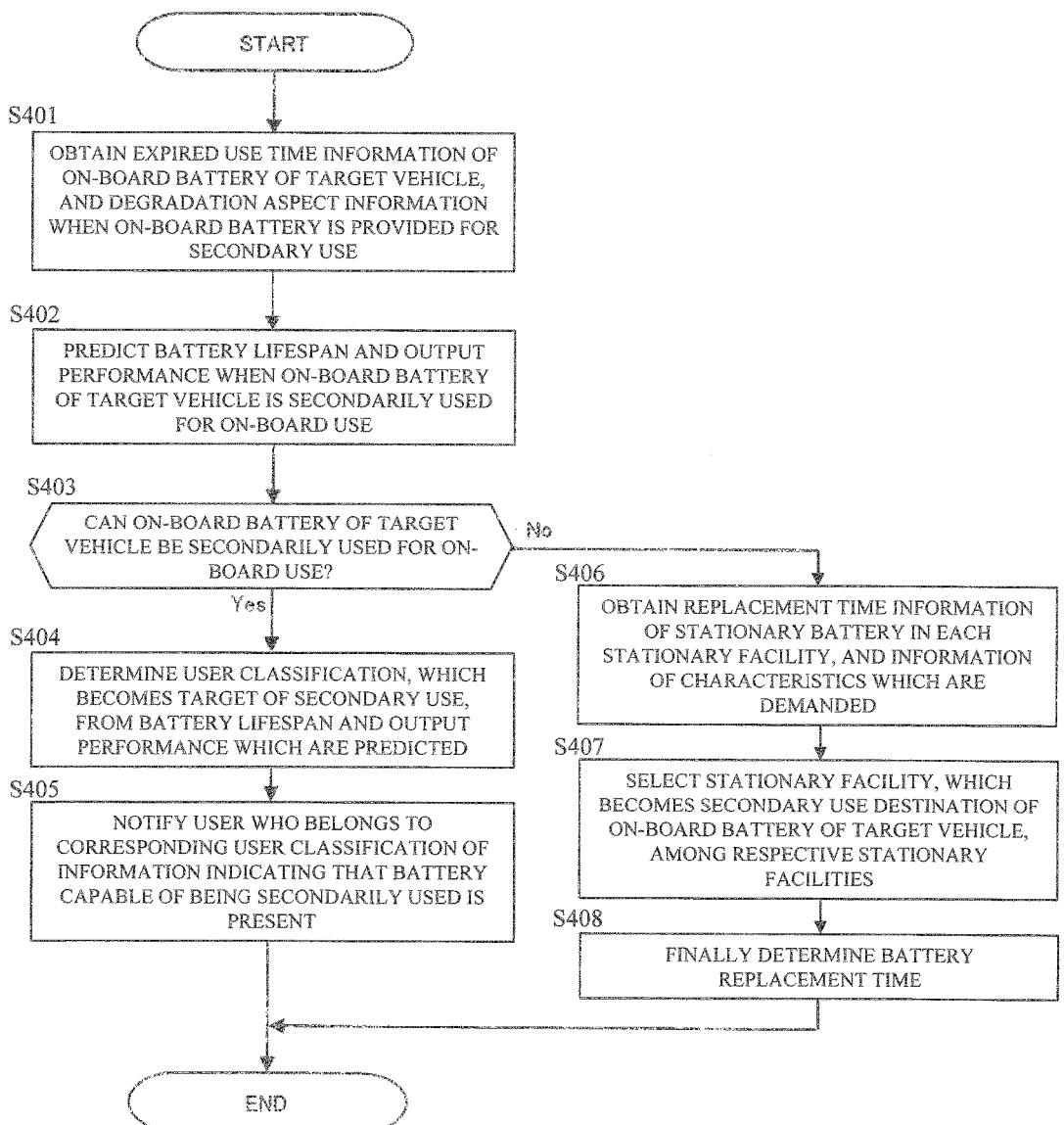
FIG. 8 is a flowchart illustrating a process which is executed by a battery secondary use management server 100 according to a third embodiment.

Hereinafter, description will be given to a specific operation which is executed by the battery secondary use management server 100 illustrated in FIG. 1 with reference to a flowchart illustrated in FIG. 8. Further, in the third embodiment, the on-board battery management server 200 and the stationary battery management server 300 illustrated in FIG. 1 operate in the same manner, and thus description of the on-board battery management server 200 and the stationary battery management server 300 will not be repeated. In addition, in the following description, description will be given to a case in which a specific one of the plurality of vehicles 20 is set as a target, but the following processes are executed with respect to all of the vehicles 20 which constitute the battery secondary use management system according to this embodiment.

First, in step S401, the battery secondary use management server 100 obtains expired use time information of the on-board battery mounted on the target vehicle 20 and degradation aspect information in a secondary use destination as well as the case of the step S301 in the first embodiment. The expired use time information and the degradation aspect information are transmitted from the on-board battery management server 200.

Then, in step S402, the battery secondary use management server 100 predicts a battery lifespan and output performance in a state in which the on-board battery is secondarily used for on-board use from the degradation aspect information in the secondary use destination of the on-board battery mounted on the target vehicle 20.

In addition, the process proceeds to step S403, in step S403, the battery secondary use management server 100 determines whether or not the on-board battery mounted on the target vehicle 20 can be secondarily used for the on-board use on the basis of the battery lifespan and the output performance which are predicted in step S402. Specifically, the battery secondary use management server 100 determines whether or not the battery lifespan and the output performance are equal to or greater than a predetermined threshold. When the battery lifespan and the output performance are equal to or greater than the predetermined threshold, it is determined that the on-board battery can be secondarily used for the on-board use, and the process proceeds to step S404 so as to secondarily use the on-board battery for the on-board use. On the other hand, when the battery lifespan and the output performance is less than the predetermined threshold, it is determined that the on-board battery cannot be secondarily used for the on-board use, and the process proceeds to step S406 so as to secondarily use the on-board battery for stationary facility use. Further, in this case, for example, the predetermined threshold is set to a value for determining whether or not the battery lifespan and the output performance are equal to or greater than a level demanded for the on-board use.

In addition, in step S403, when it is determined that the on-board battery mounted on the target vehicle 20 can be secondarily used for the on-board use, the process proceeds to step S404. In step S404, user classification of the secondary use destination is determined on the basis of the battery lifespan and the output performance which are predicted in step S402. Here, the user classification represents classification of a user of the vehicle 20 for each of an area in which a vehicle is used, a travel distance, and a necessary output. Examples of the user classification include an aspect of classification from 1 to 10 classifications as illustrated in FIG. 9.

For example, in an example illustrated in FIG. 9, when a vehicle is used in high-temperature area, the travel distance is long, and the necessary output is high, the vehicle belongs to the classification 1. In addition, a vehicle out of the classifications 1 to 9 belongs to the classification 10. The vehicle stored as a service part or exhibition vehicle belongs to the classification 10. Further, in the example illustrated in FIG. 9, as a temperature of a use area is low, the battery lifespan and the output performance are demanded to be higher. Similarly, as the travel distance is long, and as the necessary output is high, the battery lifespan and the output performance are demanded to be higher.

In addition, the process proceeds to step S405, and in step S405, the battery secondary use management server 100 performs a process of notifying the user, who belongs to the user classification determined in step S404, of information indicating that a secondarily usable battery is present. Further, examples of a method of notifying the user of the information indicating that the secondarily usable battery is present include a method of transmitting the information to an on-board device of the vehicle used by the user, a method of transmitting the information to a portable terminal such as a portable telephone and a smart phone possessed by the user, and the like. In addition, when notifying the user of the information indicating that the secondarily usable battery is present, the battery secondary use management server 100 preferably notify a specified user of the information. The specified user possesses the vehicle 20 in which the expired use time of the on-board battery is approaching and belongs to the user classification determined in step S404. In addition, when desiring to use the secondarily usable battery, the user receiving the notification can obtain the battery after taking a predetermined procedure.

On the other hand, when it is determined in step S403 that the on-board battery mounted on the target vehicle 20 cannot be secondarily used for the on-board use, the process proceeds to step S406 so as to perform a process of setting the secondary use destination to the stationary facility 30. In addition, in steps S406 to S408, a process of obtaining replacement time information of the stationary battery provided to the stationary facility 30, and information of characteristics demanded for the stationary battery after replacement, a process of selecting the stationary facility 30 which becomes the secondary use destination of the on-board battery mounted on the target vehicle 20, and a process of finally determining collection time of the on-board battery and replacement time of the stationary battery are performed in the same manner as in steps S302 to S304.

As described above, according to the third embodiment, the process of determining in advance the secondary use destination of the on-board battery which is currently mounted on the target vehicle 20, for on-board use or for stationary facility use is performed.

According to the third embodiment, it is possible to obtain the following effect in addition to the effect according to the first embodiment. That is, according to the third embodiment, when determining in advance the secondary use destination of the on-board battery mounted on the vehicle 20, it is determined whether the on-board battery can be secondarily used for the on-board use. When it is determined that the on-board battery can be secondarily used for the on-board use, the secondary use destination is set to the on-board use. Accordingly, it is possible to appropriately use a battery having performance (over specification) which is excessively higher than performance required for the stationary facility use and being reusable in the on-board use. Thus, it is possible to increase usable years of a battery for an electric vehicle or the on-board battery. Particularly, according to the third embodiment, it is possible to appropriately avoid a situation in which a high-performance on-board battery capable of being secondarily used is put for the stationary facility use, and thus the high performance of the on-board battery cannot be sufficiently utilized.

In addition, according to the third embodiment, when providing the on-board battery to the secondary use destination, the on-board battery can also be provided for the on-board use. Accordingly, a user can provide the on-board battery to the secondary use destination at a relatively high price. In addition, a user who receives the secondary use of the on-board battery can exchange the on-board battery, and thus it is not necessary for the user to newly purchase a vehicle, and the user can continuously use the vehicle only through a replacement cost of the battery. Accordingly, it is possible to raise economic efficiency.

Further, with regard to a specific example to which the third embodiment is applied, for example, when an on-board battery used in a vehicle of a user B is applied to a vehicle of a user A, it is possible to extend usable years of the vehicle of the user A.

<User A> A use area is the Kanto area, travel of 100 km for each charging is necessary as a travel pattern, and high-speed travel is frequent. In addition, with regard to a situation of the on-board battery, degradation is in progress and the user A feels inconvenience.

<User B> A use area is the Touhoku area, the number of travel years is 5 years, a residual capacity of the on-board battery is 80%, and an expired use time has passed in a vehicle of the user B.

Under these circumstances, in a case in which the on-board battery having a residual capacity of 80% in the vehicle of the user B is used in the Kanto area under a use mode of the user A, a residual lifespan is determined as three years from predicted result of the battery lifespan and the output performance.

Further, in the above-described embodiments, the battery secondary use management server 100 corresponds to a secondary use destination determining unit, an expired use time acquisition unit, and a battery replacement time information acquisition unit of the invention. The on-board battery management server 200 corresponds to an expired use time prediction unit and a notification unit of the invention. The providing side stationary battery management server 400 corresponds to an expired use time prediction unit and a notification unit of the invention. The stationary battery management server 300 and the secondary use side stationary battery management server 500 correspond to a battery replacement time prediction unit of the invention.

Hereinbefore, description has been given of the embodiments of the invention, but these embodiments are described for easy comprehension of the invention, and are not intended to limit the invention. Accordingly, respective elements which are disclosed in the embodiments are intended to include all design modifications and equivalents which pertain to the technical range of the invention.

The invention claimed is:

1. A battery secondary use management system for managing a secondary use destination of a battery in use by using information of the battery, comprising:
a first battery management server configured to:
obtain, while the battery is in use in a device, degradation degree information and use mode information of the battery in use through communication with the device including the battery, wherein
the device is a vehicle and the battery in use is an on-board battery in use in the vehicle,
the degradation degree information is indicative of a current capacity of the battery, and
the use mode information comprising at least one of:
a use frequency of the vehicle;
a travel distance in a predetermined period; and
a respective travel distance for each travel; and
predict, while the battery is in use in the device, an expiration-of-use time of the battery in use based on the degradation degree information and the use mode information;
a second battery management server configured to:
predict battery replacement times of batteries used in a plurality of secondary use destination candidates; and
a battery secondary use management server configured to:
determine, while the battery is in use in the device, in advance the secondary use destination of the battery in use before expiration of use based on the expiration-of-use time and the battery replacement times of the batteries used in the plurality of secondary use destination candidates.

2. The battery secondary use management system according to claim 1, wherein the battery secondary use management server is further configured to:
determine a secondary use destination candidate corresponding to a closest battery replacement time as the secondary use destination of the battery in use,
the closest battery replacement time being a time closest to the expiration-of-use time of the battery in use among kinds of battery replacement time of the plurality of secondary use destination candidates.

3. The battery secondary use management system according to claim 1, wherein the battery secondary use management server is further configured to:
notify the expiration-of-use time of the battery in use to a user of the battery in use or a system on which the battery in use is mounted.

4. The battery secondary use management system according to claim 1,
wherein in a case that the expiration-of-use time of the battery in use is determined in advance, the first battery management server is configured to predict the expiration-of-use time determined in advance as the expiration-of-use time of the battery in use.

5. The battery secondary use management system according to claim 1,
wherein a system of the secondary use destination is a stationary power source system.

6. The battery secondary use management system according to claim 1,
wherein the battery in use is a battery of a stationary power source system and a system of the secondary use destination is other stationary power source system different from the stationary power source system.

7. The battery secondary use management system according to claim 6, wherein the first battery management server is further configured to:
calculate time at which a battery capacity of the battery in use reaches 40% of an initial battery capacity based on the degradation degree information of the battery in use; and
predict the calculated time as the expiration-of-use time.

8. The battery secondary use management system according to claim 1, wherein the battery secondary use management server is further configured to:
determine whether or not the battery in use is available for an on-board use based on the degradation degree information of the battery in use; and
set the secondary use destination of the battery in use to a vehicle when the battery in use is available for the on-board use.

9. The battery secondary use management system according to claim 8, wherein the battery secondary use management server is further configured to:
determine a user classification of a user of a vehicle which is available for the secondary use destination based on the degradation degree information of the battery in use when the battery in use is available for the on-board use.

10. The battery secondary use management system according to claim 9, wherein the battery secondary use management server is further configured to:
provide specified information to a vehicle user corresponding to the user classification, the specified information indicating that a secondarily available battery is present.

11. The battery secondary use management system according to claim 1, wherein a single server comprises the first battery management server and the battery secondary use management server.

12. A battery secondary use management apparatus for managing a secondary use destination of a battery in use by using information of the battery, comprising:
a first battery management server configured to:
obtain expired use time information of the battery in use, the expired use time information being predicted from degradation degree information of the battery in use and use mode information of the battery in use, wherein
the battery is an on-board battery in use in a vehicle,
the degradation degree information is indicative of a current capacity of the battery,
the use mode information comprising at least one of:
a use frequency of the vehicle;
a travel distance in a predetermined period; and
a respective travel distance for each travel; and
a second battery management server configured to obtain battery replacement time information of batteries used in a plurality of secondary use destination candidates which become secondary use destination candidates of the battery in use, through communication with the secondary use destination candidates; and
a battery secondary use management server configured to determine in advance the secondary use destination of the battery in use before expiration of use based on the battery replacement time information of the batteries used in the plurality of secondary use destination candidates and the expired use time information.

13. The battery secondary use management apparatus according to claim 12, wherein the battery secondary use management server is configured to determine in advance a secondary use destination candidate corresponding to a closest battery replacement time as the secondary use destination the battery in use before expiration of use, and the closest battery replacement time is time closest to the expired use time information of the battery in use obtained by the expired use time information obtaining unit among kinds of battery replacement time of batteries used in the plurality of secondary use destination candidates.

14. The battery secondary use management apparatus according to claim 12, wherein a single server comprises the first battery management server, the battery secondary use management server and the second battery management server.

15. A method, performed by a first battery management server and a battery secondary use management server, for managing battery secondary use, comprising:
  obtaining, by the first battery management server, degradation degree information and use mode information of a battery in use through communication between the first battery management server and a device including the battery, wherein
    the device is a vehicle and the battery in use is an on-board battery in use in the vehicle,
    the degradation degree information is indicative of a current capacity of the battery, and
    the use mode information comprising at least one of:
      a use frequency of the vehicle;
      a travel distance in a predetermined period; and
      a respective travel distance for each travel;
  predicting, by the first battery management server, an expiration-of-use time of a battery in use based on the degradation degree information of the battery in use; and
  determining, by the battery secondary use management server, in advance a secondary use destination of the battery in use before expiration of use based on the expiration-of-use time and battery replacement time of the batteries used in a plurality of secondary use destination candidates.

16. The method of claim 15,
  predicting, by a second battery management server, battery replacement time of batteries used in the plurality of secondary use destination candidates;
  determining, by the battery secondary use management server, in advance a secondary use destination candidate corresponding to a closest battery replacement time as the secondary use destination of the battery in use before expiration of use,
    wherein the closest battery replacement time is time closest to the expiration-of-use time among kinds of the predicted battery replacement time which are predicted.

17. The method according to claim 15, wherein a single server comprises the first battery management server and the battery secondary use management server.

* * * * *